US010730100B2

(12) United States Patent
Kohl

(10) Patent No.: US 10,730,100 B2
(45) Date of Patent: Aug. 4, 2020

(54) METHOD AND DEVICE FOR JOINING AT LEAST TWO COMPONENTS

(71) Applicant: Daimler AG, Stuttgart (DE)

(72) Inventor: Daniel Kohl, Kirchheim (DE)

(73) Assignee: Daimler AG, Stuttgart (DE)

( * ) Notice: Subject to any disclaimer, the term of this patent is extended or adjusted under 35 U.S.C. 154(b) by 248 days.

(21) Appl. No.: 15/571,798

(22) PCT Filed: May 3, 2016

(86) PCT No.: PCT/EP2016/000726
§ 371 (c)(1),
(2) Date: Nov. 3, 2017

(87) PCT Pub. No.: WO2016/177466
PCT Pub. Date: Nov. 10, 2016

(65) Prior Publication Data
US 2019/0210093 A1 Jul. 11, 2019

(30) Foreign Application Priority Data
May 5, 2015 (DE) .......................... 10 2015 005 759

(51) Int. Cl.
*B21J 15/28* (2006.01)
*B25J 13/08* (2006.01)
(Continued)

(52) U.S. Cl.
CPC ............ *B21J 15/285* (2013.01); *B21D 39/03* (2013.01); *B21J 15/02* (2013.01); *B21J 15/025* (2013.01);
(Continued)

(58) Field of Classification Search
CPC ........ Y10S 901/34; F16B 5/0004; F16B 5/02; F16B 5/0208; F16B 5/04; B25J 11/00;
(Continued)

(56) References Cited

U.S. PATENT DOCUMENTS 4,745,681 A * 5/1988 Hollis, Jr. ............. B23P 19/105
29/739
6,067,696 A * 5/2000 Cecil ..................... B23P 19/062
29/407.01
(Continued)

FOREIGN PATENT DOCUMENTS

CN 101375066 A 2/2009
CN 103228408 A 7/2013
(Continued)

OTHER PUBLICATIONS

PCT/EP2016/000726, International Search Report dated Sep. 15, 2016 (Two (2) pages).
(Continued)

*Primary Examiner* — Tyrone V Hall, Jr.
(74) *Attorney, Agent, or Firm* — Crowell & Moring LLP

(57) ABSTRACT

A method for joining two components is disclosed. In an embodiment of the method, a joining element is inserted into the two components, and during the joining process, at least one parameter quantifying the joining process is determined. The joining element is inserted by a robot and the at least one parameter quantifying the joining process is determined by the robot. A device for joining two components is also disclosed.

2 Claims, 1 Drawing Sheet

(51) Int. Cl.
*B25J 11/00* (2006.01)
*B21D 39/03* (2006.01)
*B21J 15/02* (2006.01)
*G01L 5/24* (2006.01)

(52) U.S. Cl.
CPC ............. *B25J 11/007* (2013.01); *B25J 13/08* (2013.01); *G01L 5/24* (2013.01)

(58) Field of Classification Search
CPC ... B25J 13/08; B25J 15/00; B25J 15/02; B25J 15/28
See application file for complete search history.

(56) References Cited

U.S. PATENT DOCUMENTS

| | | | | |
|---|---|---|---|---|
| 2007/0101785 | A1* | 5/2007 | Peckham | B21J 15/02 72/17.2 |
| 2012/0271581 | A1* | 10/2012 | Draht | B21J 15/025 702/82 |
| 2012/0283875 | A1* | 11/2012 | Klumpp | B25J 9/1648 700/258 |
| 2014/0174239 | A1* | 6/2014 | Nagata | B25J 13/085 74/490.01 |

FOREIGN PATENT DOCUMENTS

| | | |
|---|---|---|
| CN | 103895016 A | 7/2014 |
| CN | 104057291 A | 9/2014 |
| DE | 38 72 033 T2 | 2/1993 |
| DE | 10 2010 006 402 A1 | 8/2011 |
| DE | 10 2010 006 403 A1 | 8/2011 |
| DE | 10 2006 002 237 B4 | 9/2012 |
| DE | 10 2014 007 554 A1 | 12/2014 |
| EP | 2 781 316 A1 | 9/2014 |
| EP | 2781316 A1 * 9/2014 | ............ B25J 9/1687 |
| JP | 2014 184516 A | 10/2014 |
| WO | WO 2011/047862 A1 | 4/2011 |

OTHER PUBLICATIONS

Chinese Office Action issued in Chinese application No. 201680025728.7 dated Mar. 9, 2020, with partial English translation (Nine (9) pages).

* cited by examiner

METHOD AND DEVICE FOR JOINING AT LEAST TWO COMPONENTS

BACKGROUND AND SUMMARY OF THE INVENTION

The invention relates to a method and a device for joining at least two components.

DE 10 2006 002 237 B4 shows a method and a device for joining at least two components. A joining element is inserted in the two components and, in the meantime, a parameter quantifying the joining process is determined. In concrete terms, the reaction force acting on the components during the joining process is detected by means of a force sensor and is used to assess the joining process and/or to assess the joining connection.

DE 10 2010 006 402 A1 shows a method for monitoring a high-speed joining process, in which at least two components are joined by means of a nail. The sound emissions arising during the joining process are detected and evaluated by means of a sensor.

Similarly, DE 10 2010 006 403 A1 shows a method for monitoring a high-speed joining process, in which at least two components are connected to each other by means of a nail. The setting force exerted when driving in the nail is determined here by means of a force sensor.

The object of the present invention is to develop a method and a device of the kind mentioned at the start in such a way that a simplified and improved monitoring and assessment of a joining process and the joining connection produced thereby is made possible.

In order to make possible an improved and simplified monitoring and assessment of a joining process and the joining connection produced thereby, it is provided in the method according to the invention that the joining element is inserted by means of a robot and the at least one parameter quantifying the joining process is determined by means of the robot. The determination of at least one or even several parameters quantifying the joining process thus does not take place by means of additional sensor technology, such as acoustic sensors or force sensors, for example, in contrast to the method known from the prior art.

Instead, it is provided according to the invention that the joining element is inserted by means of a robot into the two components to be connected, and in the meantime, a parameter quantifying the joining process is determined. As a result, it is possible to monitor the joining process itself and to assess the joining connection produced which was produced from the two components and the joining element, in a simple and reliable manner, since at least one parameter quantifying the joining process can be directly determined and also assessed by means of the robot. Additional sensors for determining one or more parameters quantifying the joining process, which are laborious, often prone to error and expensive, are thus no longer required. A process monitoring of the joining process is thus possible in a very simple, cost-effective and low-noise manner.

It is provided in an advantageous embodiment of the invention that the robot is regulated depending on the at least one parameter quantifying the joining process. The at least one parameter quantifying the joining process is thus not only determined by means of the robot; the robot is additionally regulated still depending on the at least one parameter quantifying the joining process. Here, the robot can determine and assess the at least one parameter quantifying the joining process during the whole joining process such that the robot can be correspondingly regulated and controlled, depending on the determined values for the at least one parameter, such that the best possible joining outcome can be achieved.

A further advantageous embodiment of the invention provides that a current consumption of the respective drive axes of the robot is measured and, based on this, the at least one parameter quantifying the joining process is determined. Respective current consumptions of the drive axes of the robot during the insertion of the joining element can be tapped from a robot control device or similar in a very simple manner and used for establishing or for determining the at least one parameter quantifying the joining process. Thus, the at least one parameter quantifying the joining process can be determined in a particularly simple and reliable manner.

It is provided according to a further advantageous embodiment of the invention that the force for driving in the joining element, the energy for driving in the joining element, the acceleration of the joining element and/or the path of the joining element is determined by means of the robot during the insertion of the joining element into the two components. Here, all parameters relevant to the joining process can be substantially determined, such that the joining process itself can be continuously monitored when inserting the joining element into the two components, and also the joining connection produced, which comprises the two components and the inserted joining element, can be assessed by means of the determined parameters quantifying the joining process. The joining process itself can thus be carried out in a more reliable manner for the process and also in a way that can be repeated exactly, such that in particular the quality of the joining connection can be improved.

The device according to the invention for joining at least two components is designed to insert a joining element into the two components and to determine at least one parameter quantifying the joining process during the joining process. The device according to the invention is here characterized in that the device has a robot which is designed to insert the joining element and to determine the at least one parameter quantifying the joining process. Advantageous embodiments of the method according to the invention can be seen as advantageous embodiments of the device according to the invention, wherein the device, in particular, has means for carrying out the method steps.

Further advantages, features and details of the invention arise from the description of a preferred exemplary embodiment below, as well as with the aid of the Figures. The features and combinations of features specified in the description above and the features and combinations of features specified in the description of the Figures and/or in the Figures only below can be used not only in the combination specified in each case, but also in other combinations or on their own without exceeding the scope of the invention.

DETAILED DESCRIPTION OF THE DRAWINGS

In a perspective view, two components 10, 12 are shown, before these are joined to each other by means of a joining element 14. The joining element 14 can, for example, be a nail, a setting bolt or similar. To join or to connect the two components 10, 12, the joining element 14 is inserted into the two components 10, 12 or driven into these or pressed into these. Preferably, the joining element 14 is pressed into the two components 10, 12 at a speed of less than five meters per second. On the other hand, the joining element 14 can also be inserted into the two components 10, 12 at a substantially higher speed, in particular at a speed between five and three hundred meters per second. In order to be able to ensure consistently good quality when manufacturing a joining connection from the two components 10, 12 and the joining element 14, it is important to be able to assess the joining process itself, as well as the joining connection produced. During the joining process, i.e., during the insertion of the joining element 14 into the two components 10, 12, it would thus be advantageous to be able to provide at least one parameter quantifying the joining process, preferably several parameters quantifying the joining process.

Figure 1:
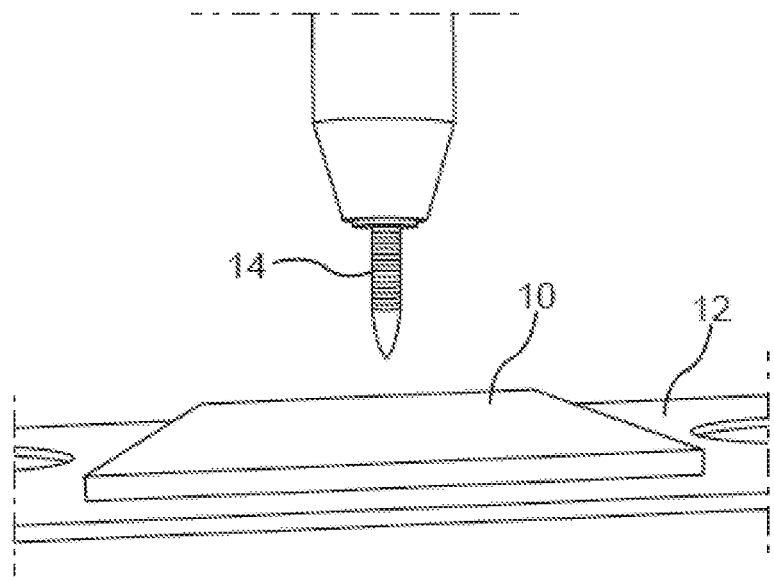
FIG. 1 is a perspective view in which a joining process of two components is depicted, into which a joining element is inserted for joining the two components.
Figure 2:
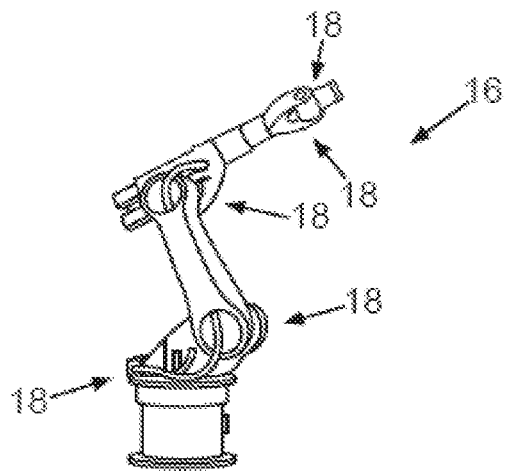
FIG. 2 is a side view of a robot, by means of which the joining element can be inserted into the two components.

In FIG. 2, a robot 16 is shown in a side view. In order to determine one or more parameters quantifying the joining process during the joining process, it is provided that the joining element 14 is inserted by means of the robot 16 and at least one parameter quantifying the joining process, preferably several parameters quantifying the joining process, is directly determined in the meantime by means of the robot 16. Here, the robot 16 is regulated depending on the at least one parameter quantifying the joining process.

To monitor and assess the joining process and joining connection produced, it is thus provided that the robot 16 inserts the joining element 14 into the two components 10, 12 and preferably determines several parameters quantifying the joining process. To determine the parameters quantifying the joining process, a current consumption, for example, of the respective drive axes 18 of the robot 16 can be measured and evaluated such that, based on this, respective parameters quantifying the joining process can be determined. No additional sensor technology is thus necessary in order to determine the parameter quantifying the joining process when driving in or inserting the joining element 14 into the two components 10, 12.

Preferably, the force for driving in the joining element 14, the energy for driving in the joining element 14, the acceleration of the joining element 14 and the path of the joining element 14 are determined by means of the robot 16 by respective current consumptions, for example, of the drive axes 18 being monitored and evaluated during the joining process.

When driving the joining element 14 into the two components 10, 12, it is thus consistently possible to monitor the process parameters essential for the joining process by means of the robot 16. For example, corresponding nominal or ideal values for the respective process parameters can be predetermined and consistently adjusted to the process parameters determined. If deviations between the process parameters actually measured or determined and the ideal values were to arise, the robot 16 can be correspondingly regulated such that the desired process parameters can be set.

The joining process can thus be monitored in a simple manner and the robot can be regulated in such a way that, preferably, an optimal joining process can be produced by a correspondingly optimal joining connection. Furthermore, it is possible to assess the joining connection produced from the two components 10, 12 and the joining element 14 by means of the process parameters determined by means of the robot 16. Thus, not only the joining process itself can be monitored and correspondingly regulated, it is also yet further possible to evaluate the quality of the completed joining connection by storing the process parameters determined during the joining process.

The invention claimed is:
1. A method for joining two components, comprising the steps of:
   inserting a joining element into the two components by a robot in a joining process;
   measuring and evaluating a current consumption of drive axes of the robot:
   determining parameters quantifying the joining process during the joining process by the robot, wherein the parameters are determined based on the measuring and evaluating of the current consumption and wherein the parameters include a force for driving in the joining element, an energy for driving in the joining element, an acceleration of the joining element, and a path of the joining element; and
   monitoring and assessing the joining process and a joining connection produced by the joining process by the determined parameters.
2. The method according to claim 1, further comprising the step of regulating the robot depending on the determined parameters.

* * * * *